(12) United States Patent
Harrop et al.

(10) Patent No.: US 8,375,643 B1
(45) Date of Patent: *Feb. 19, 2013

(54) COUPLER FOR LANDFILL TARP

(75) Inventors: Shannon Dean Harrop, Springdale, AR (US); Jerry Pietzyk, Lincoln, NE (US)

(73) Assignee: Con-Wal, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/529,650

(22) Filed: Jun. 21, 2012

Related U.S. Application Data

(63) Continuation of application No. 12/502,549, filed on Jul. 14, 2009, now Pat. No. 8,205,393.

(51) Int. Cl.
  *B09B 5/00* (2006.01)
  *B09B 1/00* (2006.01)
  *E02D 31/00* (2006.01)

(52) U.S. Cl. .................. 52/3; 52/23; 405/129.9

(58) Field of Classification Search ............ 52/3, 4, 52/23, 83; 135/908; 296/98, 99.1, 101, 100.13, 296/100.15, 100.16; 405/129.45, 129.75, 405/129.8, 129.9, 129.95
See application file for complete search history.

(56) References Cited

U.S. PATENT DOCUMENTS

| | | | | |
|---|---|---|---|---|
| 905,674 A | * | 12/1908 | Elliot | 47/25.1 |
| 1,106,624 A | * | 8/1914 | Cadwallader et al. | 47/22.1 |
| 1,786,048 A | * | 12/1930 | Williams | 296/98 |
| 2,413,061 A | * | 12/1946 | McKee et al. | 191/44.1 |
| 2,754,900 A | * | 7/1956 | Karobonik et al. | 160/37 |
| 3,785,694 A | * | 1/1974 | Sargent | 296/98 |
| 4,050,972 A | * | 9/1977 | Cardinal, Jr. | 156/71 |
| 4,455,790 A | * | 6/1984 | Curle | 52/4 |
| 4,478,012 A | * | 10/1984 | Fraioli | 52/2.25 |
| 4,578,908 A | * | 4/1986 | Ishler | 52/63 |
| 4,590,714 A | * | 5/1986 | Walker | 250/585 |
| 4,720,212 A | * | 1/1988 | Steenbergen et al. | 405/176 |
| 4,878,322 A | * | 11/1989 | Ikeda et al. | 52/2.18 |
| 4,909,667 A | * | 3/1990 | DeMello | 405/129.9 |
| 4,927,317 A | * | 5/1990 | Acosta | 414/724 |
| 5,180,203 A | * | 1/1993 | Goudy | 296/98 |
| 5,291,698 A | * | 3/1994 | Rayner, Jr. | 52/3 |
| 5,304,014 A | * | 4/1994 | Slutz | 405/129.9 |
| 5,536,116 A | * | 7/1996 | Lammers et al. | 405/129.9 |
| 5,630,735 A | * | 5/1997 | Eckert | 439/721 |
| 5,660,402 A | * | 8/1997 | Jones et al. | 280/19 |
| 5,716,165 A | * | 2/1998 | Burgert | 405/129.95 |
| 5,765,901 A | * | 6/1998 | Wilkens | 296/98 |
| 5,966,877 A | * | 10/1999 | Hawes | 52/63 |
| 6,007,138 A | * | 12/1999 | Cramaro | 296/100.11 |
| 6,142,554 A | * | 11/2000 | Carroll et al. | 296/100.12 |

(Continued)

FOREIGN PATENT DOCUMENTS

| | | |
|---|---|---|
| DE | 3330897 A1 * | 3/1985 |
| DE | 3641780 A1 * | 9/1987 |

(Continued)

*Primary Examiner* — Basil Katcheves
*Assistant Examiner* — Rodney Mintz
(74) *Attorney, Agent, or Firm* — Head, Johnson & Kachigian, P.C.

(57) ABSTRACT

A weight system for a landfill tarpaulin. A pair of parallel chains are retained, within a pair of sleeves in the tarp. A plurality of parallel wire lines traverse the tarpaulin. A plurality of elongated coupler bodies are provided with each coupler body having a first end terminating in a eyelet and a second, opposed end terminating in a hollow recess. A fastener passes through one eyelet, and passes through the tarp. At least one wire line fastener passes through an opening in the coupler body to engage one of the wire lines received in the second, opposed end hollow recess.

11 Claims, 5 Drawing Sheets

U.S. PATENT DOCUMENTS

| | | | | |
|---|---|---|---|---|
| 6,474,022 B1* | 11/2002 | Double et al. | | 52/3 |
| 6,502,890 B1* | 1/2003 | Fliege et al. | | 296/100.12 |
| 6,558,079 B1* | 5/2003 | Kozak et al. | | 405/129.15 |
| 6,558,080 B2* | 5/2003 | Kozak | | 405/129.9 |
| 6,575,393 B1* | 6/2003 | James, Jr. | | 242/390 |
| 6,769,142 B2* | 8/2004 | Ragsdale et al. | | 4/502 |
| 6,786,676 B1* | 9/2004 | Pitcher | | 405/129.9 |
| 6,865,754 B2* | 3/2005 | MacLean et al. | | 4/503 |
| 6,981,734 B2* | 1/2006 | Martin | | 296/100.12 |
| 7,018,135 B2* | 3/2006 | Kaul et al. | | 405/129.75 |
| 7,285,719 B2* | 10/2007 | Conger | | 136/245 |
| 7,367,606 B2* | 5/2008 | Ellis | | 296/100.13 |
| 7,404,582 B2* | 7/2008 | Scartozzi et al. | | 285/404 |
| 7,458,629 B2* | 12/2008 | Smith et al. | | 296/100.18 |
| RE41,442 E* | 7/2010 | Morgan et al. | | 52/23 |
| 7,871,052 B2* | 1/2011 | Baum | | 248/505 |
| 8,079,778 B2* | 12/2011 | Colkitt | | 404/100 |
| 8,205,393 B1* | 6/2012 | Harrop et al. | | 52/3 |
| 2001/0048853 A1* | 12/2001 | Kozak | | 405/129.9 |
| 2002/0034422 A1* | 3/2002 | Kozak | | 405/129.9 |
| 2002/0166289 A1* | 11/2002 | Oviedo-Reyes | | 52/4 |
| 2003/0124915 A1* | 7/2003 | Kaine et al. | | 439/798 |
| 2004/0107985 A1* | 6/2004 | Weeks | | 135/908 |
| 2004/0131454 A1* | 7/2004 | Voghel | | 414/437 |
| 2006/0010783 A1* | 1/2006 | Evans | | 52/3 |
| 2006/0065182 A1* | 3/2006 | Campbell et al. | | 116/174 |
| 2006/0150537 A1* | 7/2006 | Baum et al. | | 52/90.1 |
| 2007/0102951 A1* | 5/2007 | Chenowth | | 296/98 |
| 2007/0266644 A1* | 11/2007 | Weicht | | 52/3 |
| 2008/0141599 A1* | 6/2008 | Akdag et al. | | 52/202 |
| 2008/0277961 A1* | 11/2008 | Smith et al. | | 296/100.13 |
| 2008/0296186 A1* | 12/2008 | Daun et al. | | 206/338 |
| 2009/0013610 A1* | 1/2009 | Glynos | | 52/3 |
| 2010/0047020 A1* | 2/2010 | Lacey | | 405/129.9 |
| 2010/0074688 A1* | 3/2010 | Renaud et al. | | 405/129.9 |
| 2010/0278592 A1* | 11/2010 | Walker | | 405/129.9 |
| 2011/0227363 A1* | 9/2011 | Smith et al. | | 296/100.16 |
| 2012/0186620 A1* | 7/2012 | Holstrom | | 135/119 |

FOREIGN PATENT DOCUMENTS

| | | | |
|---|---|---|---|
| DE | 19913750 A1 | * | 10/2000 |
| EP | 497179 A2 | * | 8/1992 |
| GB | 2278374 A | * | 11/1994 |
| JP | 04281907 A | * | 10/1992 |
| JP | 2000167506 A | * | 6/2000 |
| WO | WO 9950000 A1 | * | 10/1999 |

* cited by examiner

COUPLER FOR LANDFILL TARP

REFERENCE TO PENDING APPLICATION

This application is a continuation application based on U.S. patent application Ser. No. 12/502,549, filed Jul. 14, 2009 entitled "COUPLER FOR LANDFILL TARP".

BACKGROUND OF THE INVENTION

1. Field of the Invention

The present invention relates to a weight system for a landfill tarp. In particular, the present invention relates to a coupler for retaining chains and wire lines for an interconnected weight system that would permit the weight system and tarpaulin to be wound and unwound from a spool or reel.

2. Prior Art

Various types of tarpaulins from a variety of materials are utilized in a wide variety of applications.

Increasingly, government rules and regulations require landfills to be covered at the end of each, day so that the debris is not exposed to the elements or subject to being blown by winds.

While it is possible to cover debris deposited in a landfill at the end of each day with a layer of soil, this requires a considerable amount of work each day.

Additionally, the soil cover reduces the amount of debris that can be placed in the landfill. Increasing cost and difficulty are encountered with siting, permitting and building landfills, so it is important to extend the useful life of landfills as long as possible.

Accordingly, it has become common place to cover the active site of a landfill with a tarpaulin at the end of each day and then remove the tarpaulin at the beginning of the next day. This can be done by personnel manually although it requires personnel to climb over the debris and garbage which can be time consuming and dangerous. Additionally, machines have been developed to wind the tarpaulin on a spool or reel at the beginning of the day and then unwind the tarpaulin from the spool or reel onto the landfill at the end of the day. For example, see U.S. Pat. No. 5,304,014 and U.S. Patent Publication No. 2004/0131454 for examples of machines developed for this purpose.

The landfill tarpaulins are often ballasted or weighted so they will not be blown by winds. Manually placing weights, such as tires, on top of the tarpaulin is possible although, again, this requires personnel at the landfill site.

The tarpaulins used in these operations, however, typically have a pair of chains running lengthwise along the length of the tarpaulin. The chains are retained in sleeves or pockets formed in the tarp along the edges. Periodically, a relatively stiff wire line or wire lines traverse the tarpaulin to weigh down the tarpaulin and prevent wind from moving the tarp. Steel cable up to ⅞" in diameter is used. The cables may be spaced apart 10 to 12 feet along the length of the tarp.

Traditionally, cables have been held captive within the sleeve by sewing or otherwise securing the ends of the sleeves. The wire lines can punch through the sleeves of the tarp, allowing the cable to flail about which can damage the tarp and vulnerable hydraulic hoses and components.

Additionally, when the tarpaulin was wound on a spool, there is a tendency for the tarpaulin to bunch toward the center. When the tarpaulin is deployed, the bunched section results in a reduced coverage area.

Accordingly, there remains a need for a weight system for a landfill tarpaulin which will include couplers to join the chains with the cables.

Additionally, there remains a need for a coupler for a landfill tarpaulin which permits winding and unwinding from a spool or reel which is less, likely to damage the tarpaulin.

Moreover, there is a need for an interconnected weight system for a landfill tarpaulin which will assist in deploying and winding the tarpaulin without bunching or otherwise reducing coverage area.

SUMMARY OF THE INVENTION

The present invention is directed to a weight system for a landfill tarp. The weight system includes a pair of parallel chains, each having a plurality of links, which are retained within a pair of sleeves which run along the entire length of the tarpaulin.

A plurality of parallel wire lines periodically traverse the tarp between the chains. The wire lines are each retained within a sleeve forming pockets for receipt of the wire line.

The wire lines are secured to the chains by a plurality of elongated couplers. An elongated coupler body has a first end terminating in an eyelet. The elongated coupler body also has a second, opposed end terminating in a hollow recess. A chain fastener composed of a threaded bolt and nut passes through the eyelet, passes through one of the links of the chain, and also passes through the sleeve of the tarp. At least one wire line fastener passes through an opening provided in the coupler body so that one end of the wire line fastener engages one of the wire lines, received in the hollow recess.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
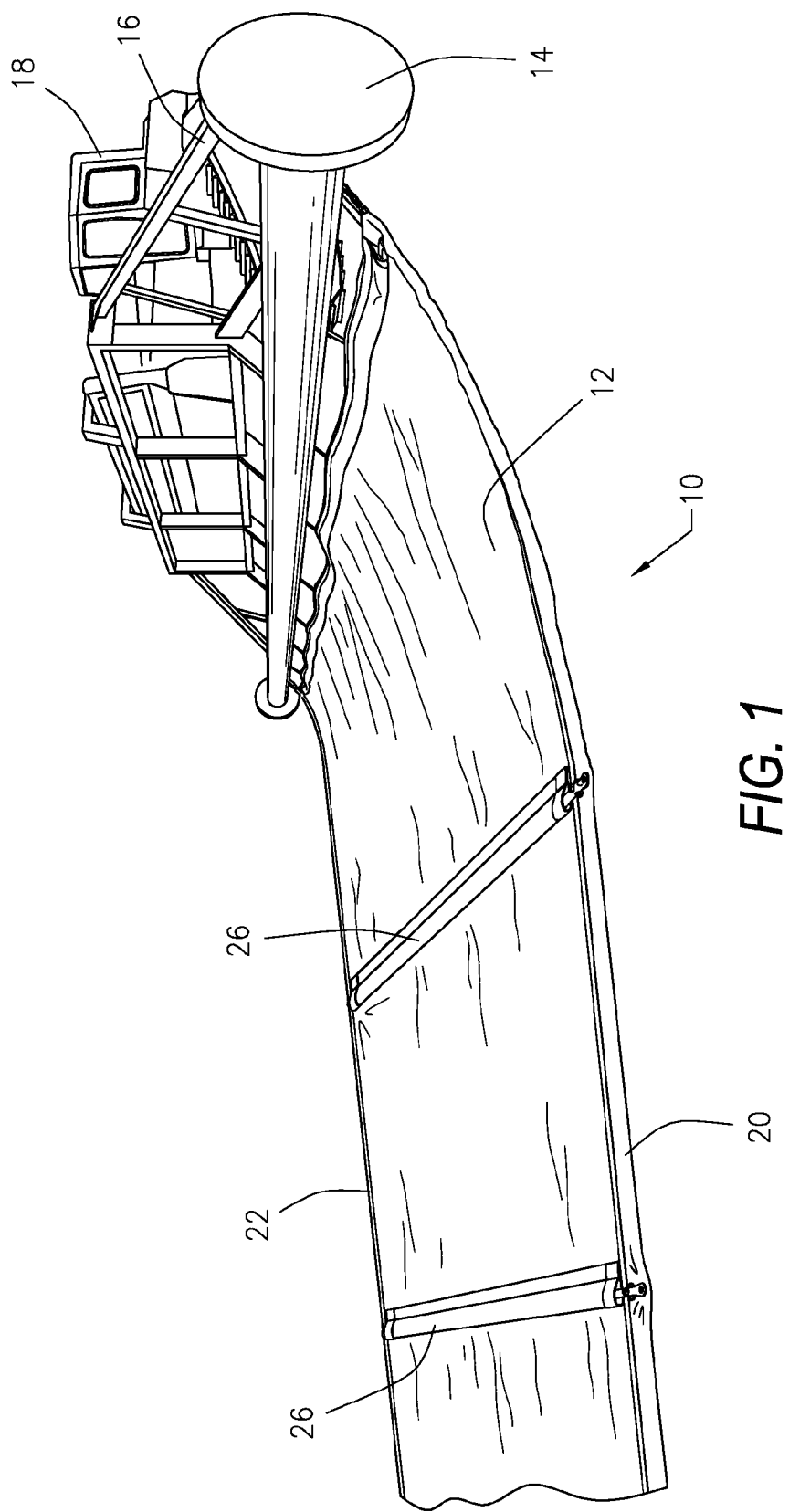
FIG. 1 illustrates a perspective view of a weight system for a landfill tarpaulin constructed in accordance with the present invention.

FIG. 1 illustrates a perspective view of an interconnected weight system 10 for a landfill tarp 12. The tarpaulin may be constructed of any flexible material, such as polypropylene. The tarpaulin may be any dimension although 40 feet by 100 feet is typical. In the embodiment shown, the tarp 12 is connected at one end to a spool or reel 14 which is mounted for rotation on a framework 16. The spool is wound and unwound by hydraulic power using motive force from machinery 18, such as a bulldozer, backhoe, or other device having an hydraulic system.

The weight system 10 includes a pair of parallel chains (to be described in detail), each having a plurality of links, which are retained within a pair of sleeves 20 and 22 which run along the edge of the tarpaulin 12. The sleeves 20 and 22 form pockets for receipt of the chains. The chains provide weight to prevent the tarp 12 from being blown or otherwise moved from the desired location.

As will be described in detail, a plurality of parallel wire lines (to be described, in detail) periodically traverse the tarp between the chains and the sleeves 20 and 22. The wire lines are likewise retained in sleeves 26 forming pockets for receipt of the wire lines.

When the tarpaulin 12 is wound on the spool or reel 14, the parallel chains and traverse wire lines are also wound on the spool or reel 14.

Figure 2:
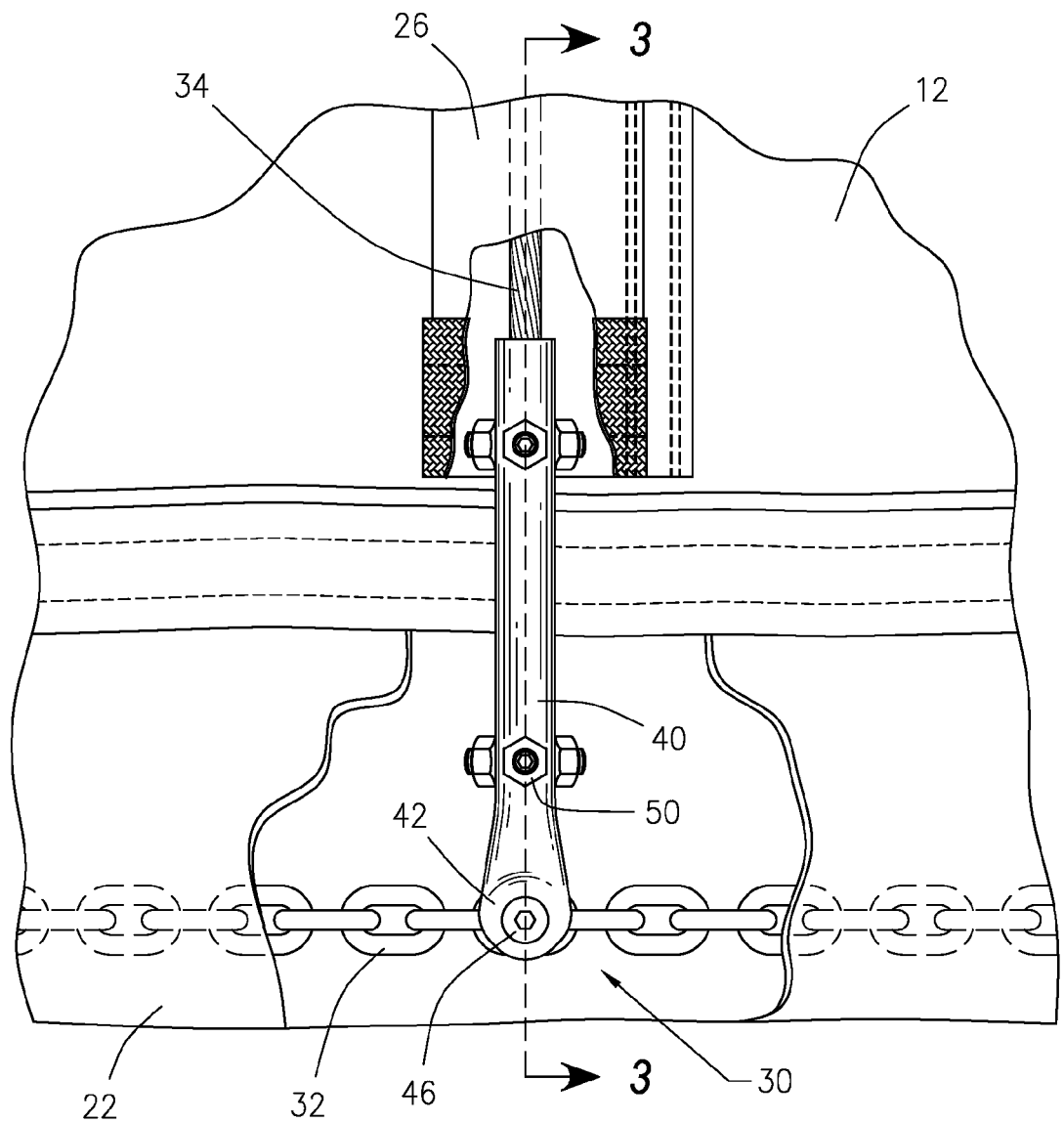
FIG. 2 illustrates a portion of a first preferred embodiment of the weight system for a landfill tarpaulin shown in FIG. 1 with portions of the tarpaulin cut-away for ease of viewing.

FIG. 2 illustrates a first preferred embodiment of the present invention. Wire lines 34 are secured to the chains by a plurality of elongated couplers 30, one of which is shown in FIG. 2. One of the chains 32 shown in FIG. 2 is retained within the sleeve 22 of the tarp. The wire line 34 is retained within the sleeve 26 of the tarp. Each of the wire lines 34 is substantially perpendicular to the chains 32.

Figure 3:
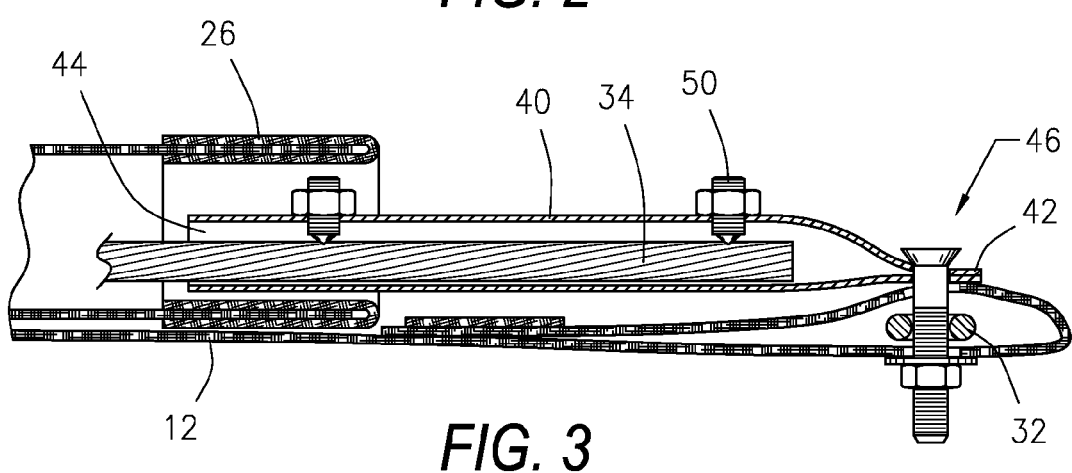
FIG. 3 is a sectional view taken along section line 3-3 of FIG. 2.

An elongated coupler body 40 has a first end terminating in an eyelet 42. The elongated coupler body 40 also has a second, opposed end terminating in a hollow recess 44 as best seen in the sectional view of FIG. 3 taken along section line 3-3 of FIG. 2. A chain fastener 46 passes through the eyelet 42, passes through one of the links of the chain 32, and also passes through the sleeve of tarp 12. The first end and eyelet 42 are flattened as may be appreciated from FIG. 3.

In the present embodiment, the chain fastener 46 is composed of a threaded bolt, a washer, and a threaded nut although other fasteners are possible within the spirit and scope of the invention.

At least one threaded wire line fastener 50 passes through an opening in the coupler body 40 so that one end of the wire line fastener 50 engages one of the wire lines 34 which is received in the hollow recess 44. A threaded nut may be secured to the body 40 aligned with the opening. The wire line fastener may be a recessed set screw so that no head protrudes from the coupler 30.

Alternately, the coupler may be attached and secured to the wire line 34 by means of mechanically swaging the two together as is known in the art (not shown).

Figure 4:
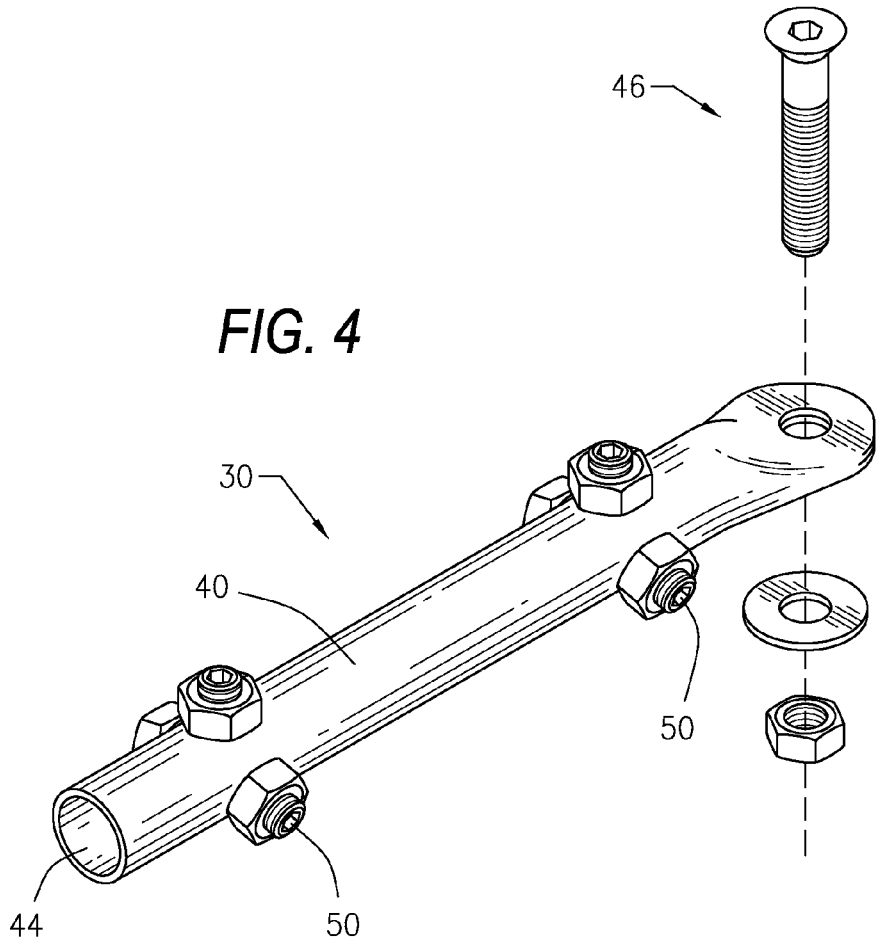
FIG. 4 is an exploded view of a coupler of the weight system for a landfill tarpaulin shown in FIGS. 1 through 3.
Figure 5:
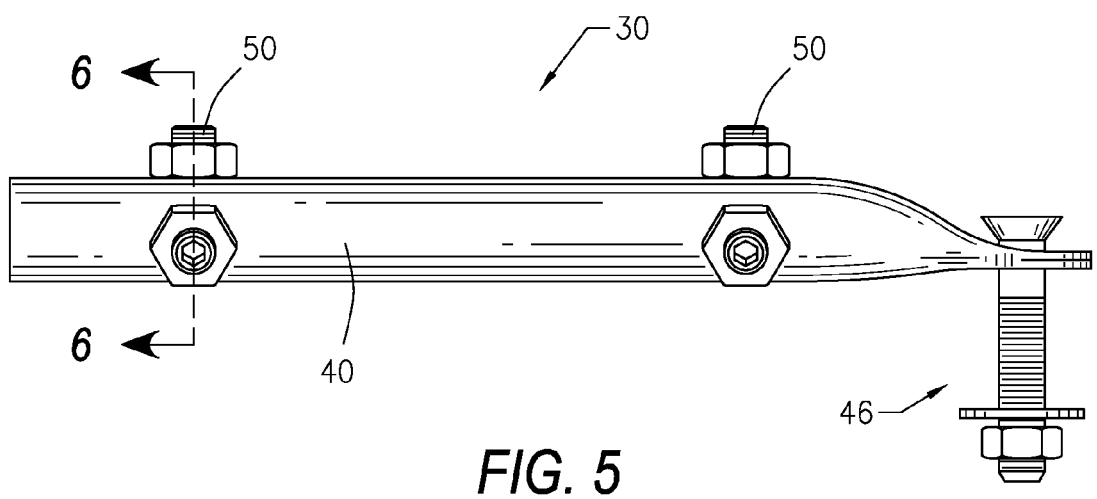
FIG. 5 is a side view of a coupler shown in FIG. 4.

FIG. 4 illustrates an exploded view of the first preferred embodiment of the coupler 30 and fastener 46 apart from the rest of the weight system and apart from the tarp. FIG. 5 illustrates a side view of the coupler 30 and fastener 46 apart from the balance of the weight system and the tarp.

Figure 6:
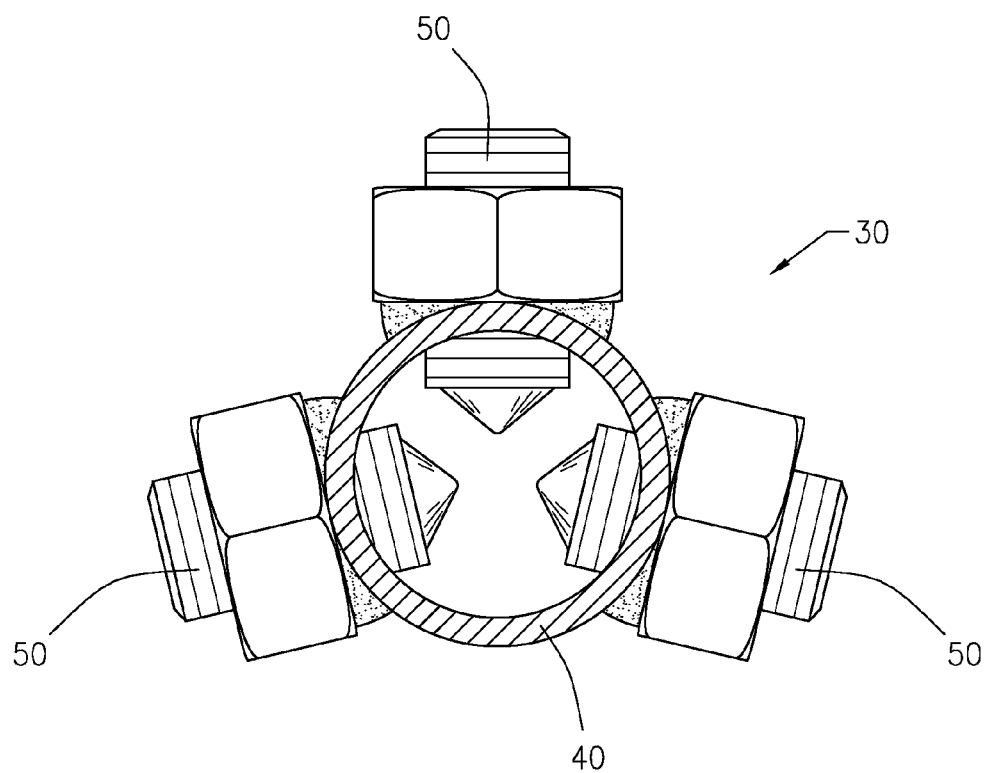
FIG. 6 is a sectional view taken along section line 6-6 of FIG. 5.

FIG. 6 illustrates a sectional view taken along section line 6-6 of FIG. 5. A first set of three wire line fasteners 50 and threaded nuts are welded circumferentially around the elongated body spaced approximately 120° apart. A second set of three wire line fasteners is also provided.

Figure 7:
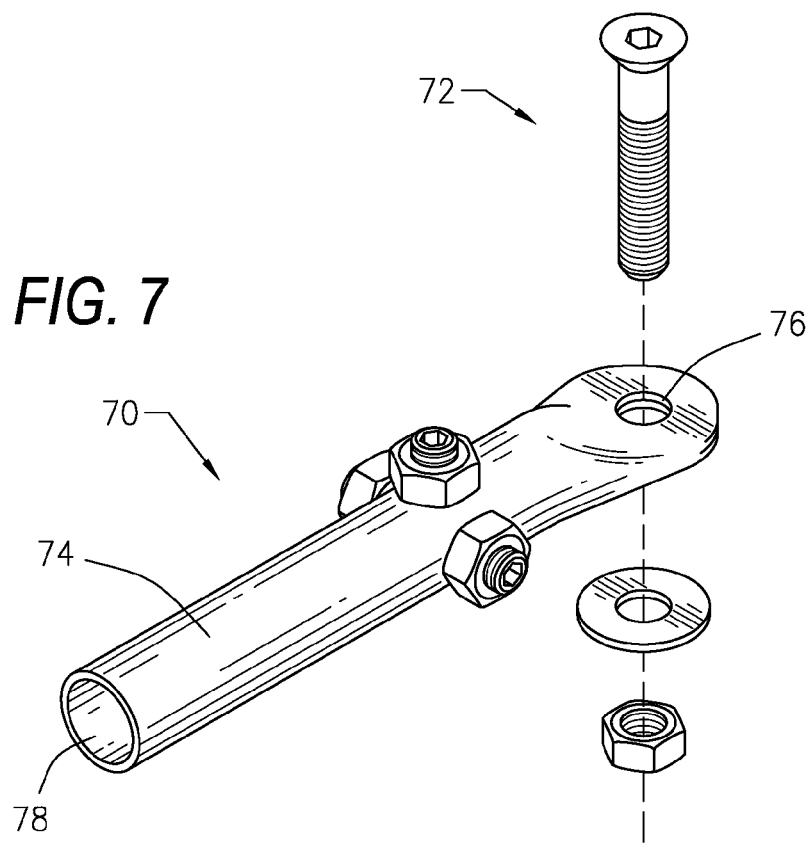
FIGS. 7, 8 and 9 illustrate a second preferred embodiment of the weight system for a landfill tarpaulin constructed in accordance with the present invention.
Figure 8:
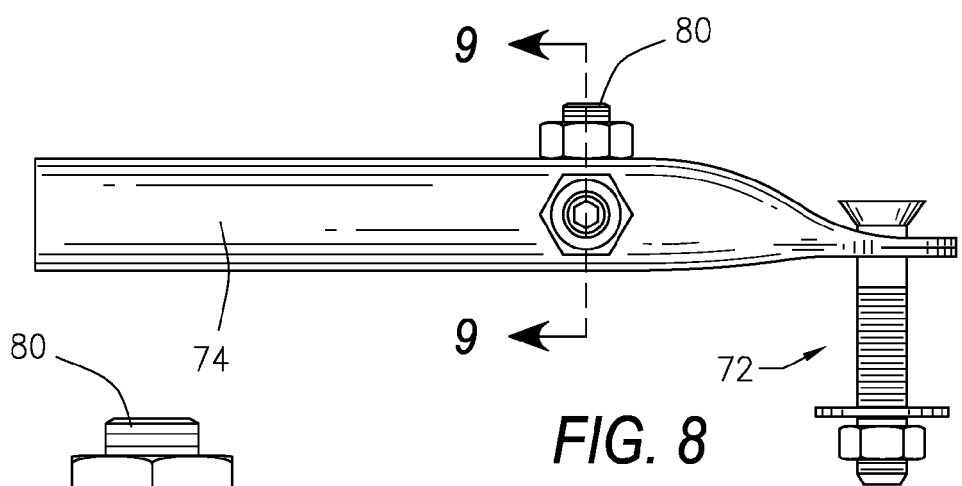
Figure 9:
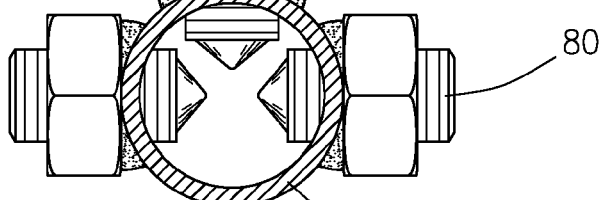

FIGS. 7, 8 and 9 illustrate a second preferred embodiment of the present invention.

FIG. 7 illustrates an exploded view of a coupler 70 and a threaded fastener 72 apart from the rest of the weight system and apart from the tarp 12. An elongated coupler body 74 has a first end terminating in an eyelet 76. The elongated coupler body 74 also has a second, opposed end terminating in a hollow recess 78.

FIG. 8 illustrates a side view of the coupler 70 and threaded fastener 72 apart from the balance of the weight system and the tarp.

FIG. 9 illustrates a sectional view taken along section line 9-9 of FIG. 8. A single set of three wire line fasteners and threaded nuts are welded circumferentially around the elongated body 74. Two of the wire line fasteners and threaded nuts are diametrically opposed about a horizontal center line plus, an additional wire line fastener and threaded nut is perpendicular to the horizontal center line. When the threaded nuts engage the wire line (not shown) inserted in the open end 78, the wire line is secured to the coupler.

Whereas, the present invention has been described in relation to the drawings attached hereto, it should be understood that other and further modifications, apart from those shown or suggested herein, may be made within the spirit and scope of this invention.

What is claimed is:

1. A weight system for a landfill tarp, which comprises:
   a pair of parallel chains retained within a pair of sleeves in said tarp;
   a plurality of parallel wire lines traversing said tarp;
   a plurality of elongated coupler bodies, each elongated coupler body having a first end terminating in an eyelet and a second, opposed end;
   a fastener passing through said eyelet in said first end and connecting to said tarp, wherein said fastener passing through said eyelet connects directly or indirectly to one of said sleeves in said tarp for said chains; and
   a wire line fastening mechanism securing an end of one of said wire lines to one of said second, opposed ends of said elongated coupler bodies.

2. The weight system for a landfill tarp as set forth in claim 1 wherein said wire line fastening mechanism includes at least one wire line fastener passing through an opening in said coupler body and engaging one of said wire lines received in said second end.

3. The weight system for a landfill tarp as set forth in claim 2 wherein each said wire line fastener is a recessed set screw.

4. The weight system for a landfill tarp as set forth in claim 1 wherein said tarp, said parallel chains, said plurality of wire lines, and said plurality of coupler bodies wind on a spool with said parallel chains winding circumferentially around said spool.

5. The weight system for a landfill tarp as set forth in claim 1 wherein each said coupler body first end is flattened.

6. The weight system for a landfill tarp as set forth in claim 1 wherein each said wire line is retained within a sleeve in said tarp.

7. A weight system for a landfill tarp, which comprises:
   a pair of parallel chains retained within a pair of sleeves running the entire length of said tarp;
   a plurality of parallel wire lines traversing said tarp, each said wire line retained in a sleeve of said tarp;
   a plurality of elongated coupler bodies, each elongated coupler body having a first end terminating in an eyelet and a second, opposed end;
   a fastener passing through said eyelet in said first end and passing through said tarp, wherein said fastener passing through said eyelet connects directly or indirectly to one of said sleeves in said tarp for said chains; and
   at least one wire line fastener at each said second end in said coupler body engaging one of said wire lines.

8. The weight system for a landfill tarp as set forth in claim 7 wherein each said wire line fastener is a recessed set screw.

9. The weight system for a landfill tarp as set forth in claim 7 wherein said each coupler body first end is flattened.

10. A weight system for a landfill tarp, which comprises:

a pair of parallel chains retained within a pair of sleeves in said tarp;

a plurality of parallel wire lines traversing said tarp;

a plurality of elongated coupler bodies, each elongated coupler body having a first end terminating in a connection mechanism and a second, opposed end;

said connection mechanism securing said first end of said coupler body to said tarp, wherein said connection mechanism is directly or indirectly secured to one of said sleeves in said tarp for said chains; and a wire line fastening mechanism securing an end of one of said wire lines to said second, opposed end.

11. A coupler for a landfill tarp weight system, which coupler comprises:

an elongated coupler body having a first end terminating in an eyelet and a second, opposed end;

a fastener passing through said eyelet and directly or indirectly connecting said first end of said coupler body to a sleeve in a tarp for a chain; and a wire line fastening mechanism securing an end of a wire line to said second, opposed end.

* * * * *